March 14, 1967 C. F. CLARK ETAL 3,309,105
STEERING APPARATUS FOR VEHICLES
Filed Oct. 22, 1964 5 Sheets-Sheet 1

INVENTORS
CHARLES F. CLARK
EVERETT L. MESSENGER
BY HARRY E. ARTER

Schmieding & Fultz
ATTORNEYS

INVENTORS
CHARLES F. CLARK
EVERETT L. MESSENGER
BY HARRY E. ARTER
Schmieding & Fultz
ATTORNEYS March 14, 1967 C. F. CLARK ETAL 3,309,105

STEERING APPARATUS FOR VEHICLES

Filed Oct. 22, 1964 5 Sheets-Sheet 4

INVENTORS
CHARLES F. CLARK
EVERETT L. MESSENGER
BY HARRY E. ARTER

*Schmieding & Sultz*

ATTORNEYS

March 14, 1967 C. F. CLARK ETAL 3,309,105
STEERING APPARATUS FOR VEHICLES
Filed Oct. 22, 1964 5 Sheets-Sheet 5

INVENTORS
CHARLES F. CLARK
EVERETT L. MESSENGER
BY HARRY E. ARTER

*Schmieding & Fultz*
ATTORNEYS

United States Patent Office 3,309,105
Patented Mar. 14, 1967

3,309,105
STEERING APPARATUS FOR VEHICLES
Charles F. Clark, Sandusky, Everett L. Messenger, Galion, and Harry E. Arter, Crestline, Ohio, assignors to The Cobey Corporation, Galion, Ohio, a corporation of Ohio
Filed Oct. 22, 1964, Ser. No. 405,772
6 Claims. (Cl. 280—99)

The present invention relates generally to vehicles and particularly to a novel vehicle provided with two pair of steerable front wheels in tandem alignment.

In general, the present invention is applicable to vehicles adapted to carry a heavy load such as farm wagons, bunk feeders, and the like. Such vehicles include a frame means that supports a body means, two or more rear wheels, two pairs of front wheels in tandem alignment and a novel steering means which includes a tongue portion and a linkage means by which all four front wheels are coordinated to track a course without skidding responsive to various angles of turn of the tongue portion.

Many types of farm wagons, such as forage and bunk feeders and the like, carry up to eighty per cent of the total load toward the forward end as much of the accessory equipment and mechanisms are mounted there. As a result the wear of the front tires is great and the stability of the wagon becomes greatly lessened as the load increases.

As one aspect of the present invention the novel construction of the vehicle permits the use of two pair of front wheels in tandem alignment which are steerable by means of a single tongue portion and an associated linkage means.

As another aspect of the present invention, the novel construction of the tongue portion and the linkage means permits the negotiation of a turn wherein all four front wheels are coordinated to follow a non-skidding track.

As another aspect of the present invention, the novel construction of the vehicle permits greater stability and maneuverability while reducing tire wear when carrying greater loads than vehicles of conventional construction.

As still another aspect of the present invention, the novel construction of the wheel means provides a stronger and more durable vehicle base than vehicles presently in use in which breakage of the wheel spindles frequently occur during use on rough or irregular terrain.

As a further aspect of the present invention, the novel construction of the steerable front wheels and the associated steering means permit low cost manufacture and fabrication using standard techniques and procedures.

It is, therefore, an object of the present invention to provide a vehicle having two pair of steerable front wheels in tandem alignment.

It is another object of the present invention to provide a vehicle of the type described which employs a tongue portion and novel linkage means to steer the vehicle to permit all four front wheels to follow a non-skidding track when the vehicle is negotiating a turn.

It is another object of the present invention to provide a vehicle of the type described which permits a reduction in tire wear and greater stability and maneuverability under heavy load conditions.

It is still another object of the present invention to provide a vehicle of the type described which is of such durable construction as to virtually eliminate the breakage of wheel spindles during use on rough or irregular terrain, such breakage frequently occurring in vehicles presently in use.

It is a further object of the present invention to provide a vehicle of the type described which may be manufactured and fabricated at minimum cost using standard techniques and procedures.

Further objects and advantages of the present invention will be apparent from the following description, reference being had to the accompanying drawings wherein a preferred form of embodiment of the invention is clearly shown.

Figure 1:
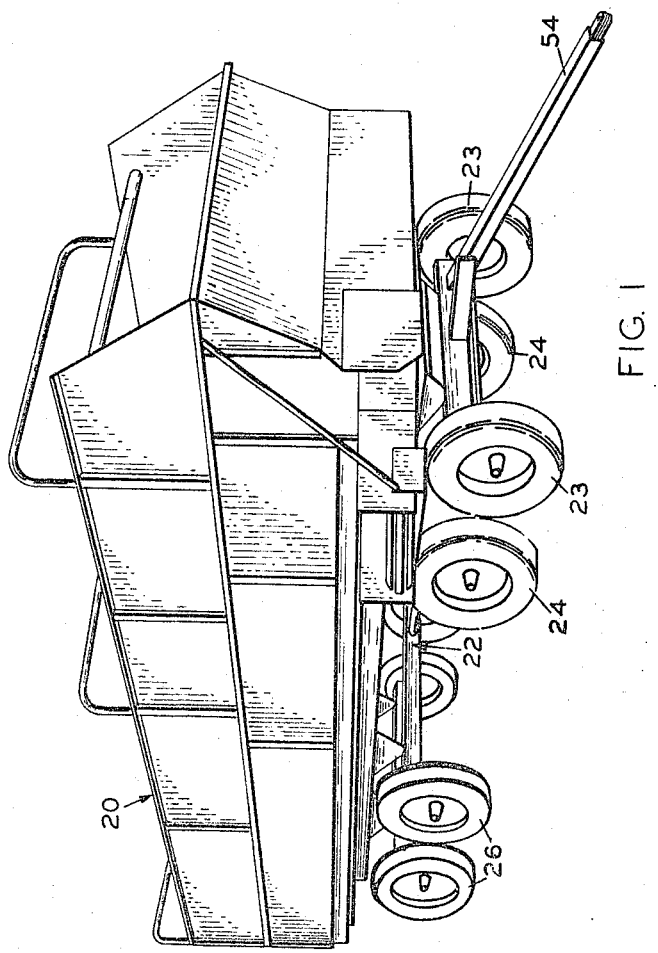
FIG. 1 is a perspective view of a vehicle constructed in accordance with the present invention.
Figure 2:
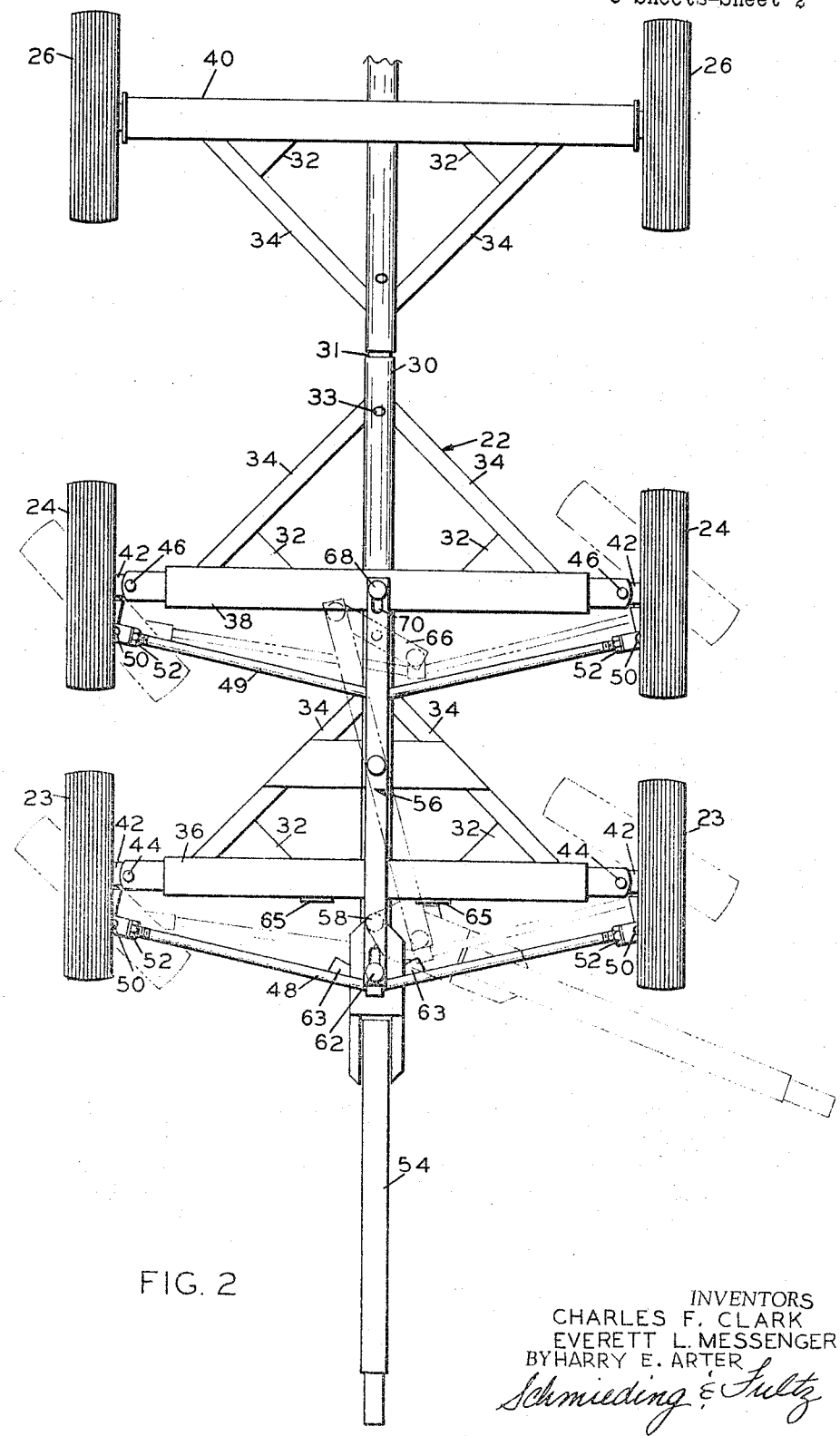
FIG. 2 is a partial top view of the frame means, the wheel means, and the steering means of the vehicle illustrated in FIG. 1.
Figure 6:
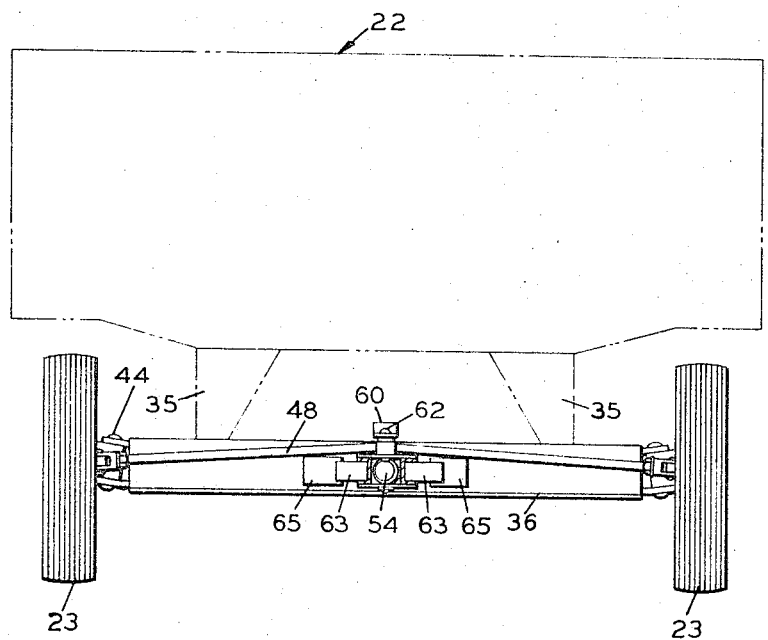
FIG. 6 is a front view illustrating the frame and steering means of the vehicle of the preceding figures.

Referring in detail to the drawings, a vehicle constructed in accordance with the present invention is illustrated in FIG. 1. A body means or wagon bed, indicated generally at 20 is mounted on a frame means indicated generally at 22. Wheel means including two pair of front wheels 23 and 24 in tandem alignment and rear wheels 28 are operatively connected to frame means 22. Referring to FIGS. 2 and 6, frame means 22 includes tubular members 30 that are telescoped over a reachpole 31 extending the entire length of body means 20. Tubular members 30 are secured to reachpole 31 by pins 33. Support members 32 and 34 are fastened to tubular members 30 and axle means 36, 38, and 40.

Front wheels 23 and 24 are rotatably mounted on spindles 42 which are pivotably connected to a respective axle means 36 and 38, at pivot pins 44 and 46. Tie rods 48 and 49 are connected between respective pairs of front wheels 23 and 24 at pin 50 and may be adjusted in length at threaded junctions 52.

Rear wheels 26 are rotatably mounted to spindles similar to spindles 42 which are welded to rear axle means 40.

Figure 3:
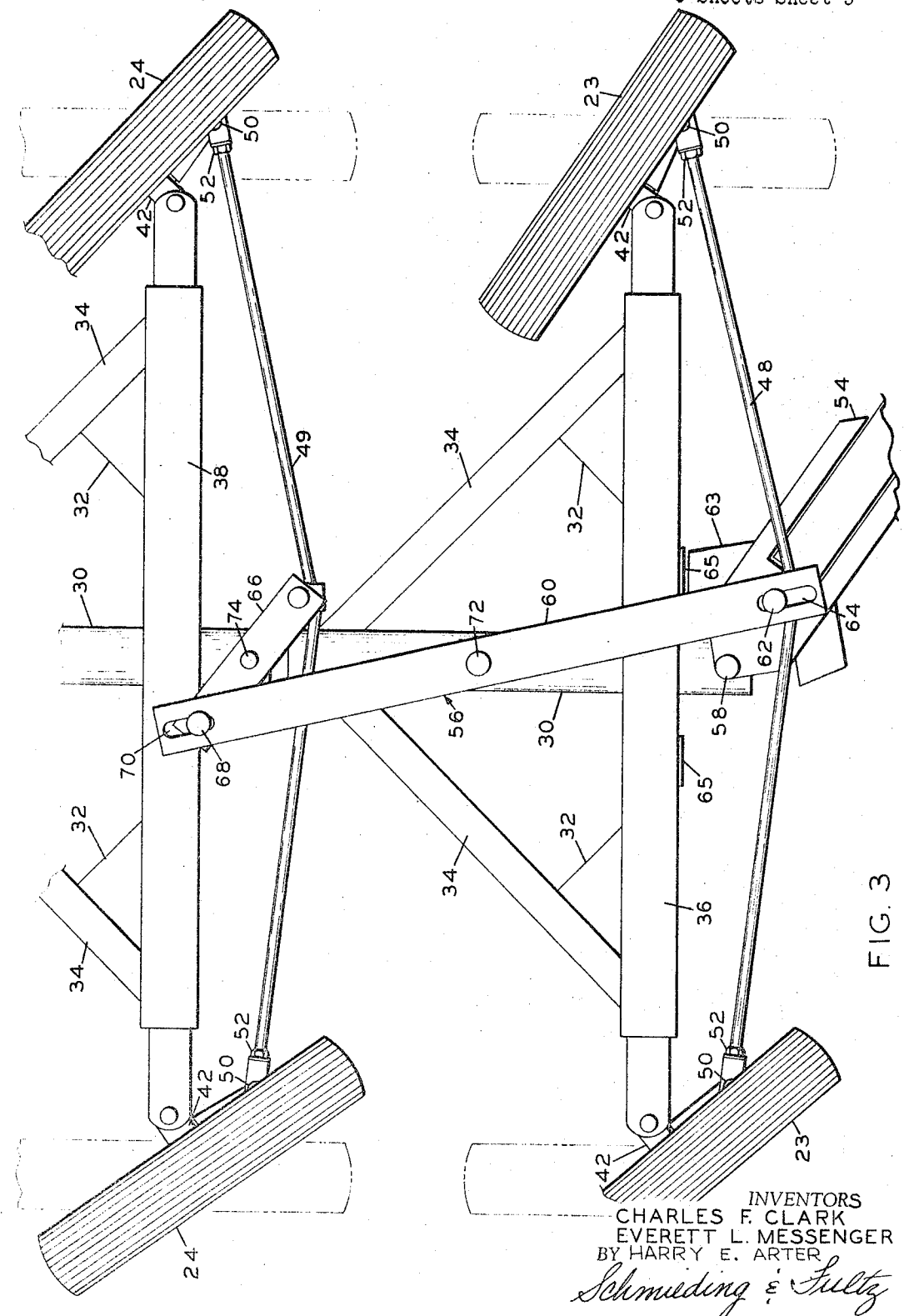
FIG. 3 is an enlarged partial top view of the front wheels and steering means of the vehicle of the present invention.

Now referring to FIGS. 2 and 3, the steering means for the vehicle comprises a tongue portion 54 adapted to be attached to a conventional tractor or other towing vehicle, and a linkage means indicated generally at 56. The linkage means 56 coordinates the degree of turn of front wheels 23 and 24 responsive to the degree of turn of tongue portion 54 to permit a turn to be negotiated with wheels 23 and 24 following a rolling, non-skidding track.

Figure 4:
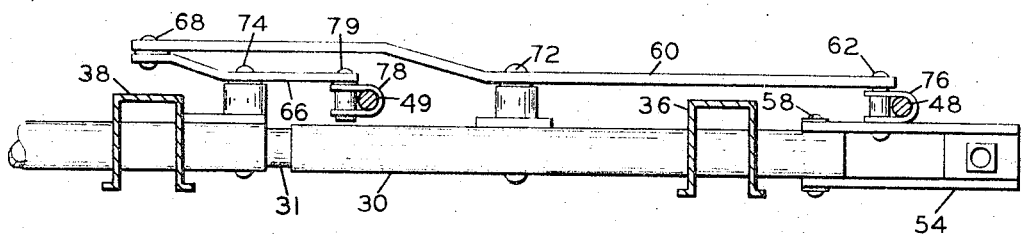
FIG. 4 is a partial side sectional view of the forward end of the vehicle of the present invention.

With reference to FIGS. 2 through 4, tongue portion 54 is pivoted to tubular members 30 by a pin 58 and to steering lever bar 60 by a pin 62 in a slot 64. A lost motion connection is therefore formed between lever bar 60 and tongue portion 54. A stop means 63 is attached to tongue portion 54 to limit its degree of turn to the locations where stops means 63 contacts one of the shoulders 65 on axle means 36.

As best seen in FIGS. 3 and 4, a shorter lever bar 66 is pivoted at one end to longer lever bar 60 by a pin 68 in a slot 70, said pin and slot forming a lost motion connection between lever bars 60 and 66.

Longer lever bar 60 and shorter lever bar 66 are pivoted intermediate their ends to tubular members 30 by pins 72 and 74 respectively. The forward end of lever bar 60 is fastened to the center of tie rod 48 by a clamp 76 and pin 62 and shorter lever bar 66 is securely fastened to tie rod 49 by a clamp 78 and pin 79. It is therefore understood from FIGS. 3 and 4 that the movements of lever bars 60 and 66 are transferred to the wheels 23 and 24 respectively.

Figure 5:
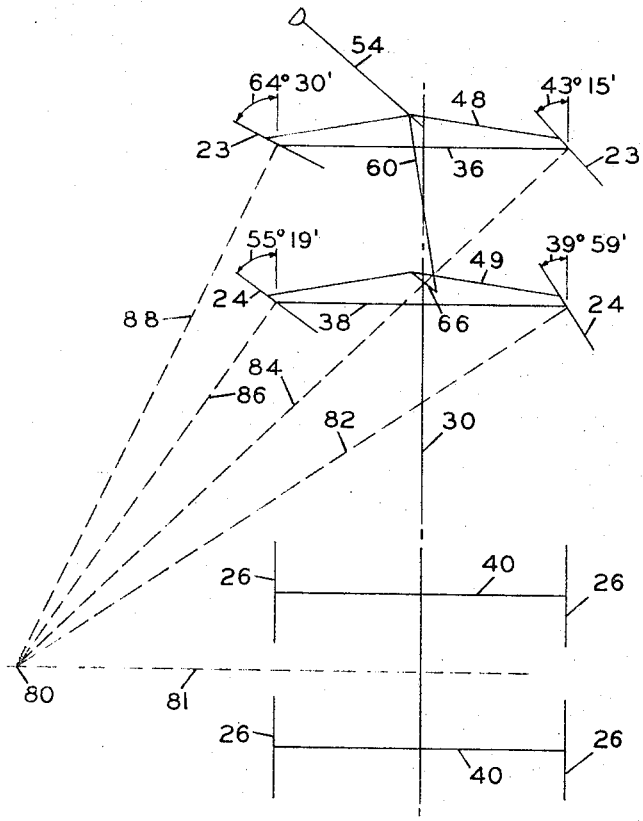
FIG. 5 is a diagrammatic view illustrating the maximum angles of turn of the front wheels of a typical vehicle constructed in accordance with the present invention.

FIG. 5 is a diagrammatic view illustrating the maximum angle of turn of each of the wheels 23 and 24 which is reached when tongue portion 54 is turned to the left until stop means 63 rests against one of the shoulders 65 on axle means 36.

Using standard SAE turning ability formulas, the angle through which the tongue portion 54 is turned determines the proper angle through which the right wheel of pair 23 should turn.

The center about which each wheel turns is then determined by extending a line 84 through the intersection of axle means 36 and the right wheel of pair 23 perpendicular to the instantaneous direction of travel of that wheel until it intersects a line 81 located midway between the rear pair of axles 40 perpendicular to tubular members 30. This point of intersection is the turning center 80 for each of the front wheels 23, 24. The lines 82, 84, 86, and 88 represent the turning radius for each wheel. An arc is drawn using these radii and the tangent to each arc at the point of intersection of each axle means with a respective wheel represents the proper direction of travel for each wheel with respect to the angle of turn of tongue portion 54.

It is important to point out that the intermediate pivot 72 of longer lever bar 60 is preferably located farther from the forward end than the rearward end of lever bar 60. Further the intermediate pivot 74 of shorter lever bar 66 is preferably located equidistant from its ends and the distance between pivot 74 and one end of lever bar 66 is preferably equal to the distance between pivot pin 58 and pin 62 when the lever bar 66 is aligned with tubular members 30.

In operation, the tongue portion is attached, for example, to a conventional farm tractor. When a turn is to be negotiated, both pair of front wheels 23 and 24 respond to the degree of turn of tongue portion 54 with each wheel following a non-skidding track as linkage means 56 transfers the motion of tongue portion 54 to both pair of front wheels 23 and 24 in the proper proportion.

As the forward end of lever bar 60 swings to the left, as shown in FIG. 3, by the action of tongue portion 54, tie rod 48 is moved a proportional distance to the left and correspondingly wheels 23 are pivoted in the same direction. At the same time, the rear end of lever bar 60 swings to the right causing the end of shorter lever bar 66 connected to tie rod 49 to move to the left which results in pivoting the wheels 24 to the left. The front wheels being so controlled enable the body means to carry a greater load, especially in the forward end, and yet maintain a high degree of stability and maneuverability because all four front wheels are turned at the correct angle for proper tracking.

While the form of embodiment of the present invention as herein disclosed constitutes a preferred form, it is to be understood that other forms might be adopted, all coming within the scope of the claims which follow:

1. A vehicle comprising, in combination, body means; frame means supporting said body means; wheel means connected to said frame means including a first and second pair of front wheels disposed in tandem alignment on each side of said body means and one or more pair of rear wheels in alignment with but spaced from said front wheels; and steering means connected to said frame means and including a tongue portion for steering said vehicle; a longer lever pivotably mounted on said frame means and including a front end pivotably connected to said tongue and a rear end; a shorter lever pivotably connected to said frame and including a first end pivotably connected to said rear end of longer lever and a second end; and means connecting said second end of said shorter lever to said second pair of front wheels.

2. A vehicle comprising, in combination, body means; frame means supporting said body means; wheel means connected to said frame means including a first and second pair of front wheels disposed in tandem alignment on each side of said body means and one or more pair of rear wheels in alignment with but spaced from said front wheels; and steering means comprising a tongue portion pivoted to said frame means and a linkage means for coordinating the degree of turn of said pairs of front wheels with respect to the degree of turn of said tongue portion, said linkage means comprising a longer lever arm pivoted at its forward end to said tongue portion and a shorter lever arm pivoted to the rearward end of said longer lever arm, each of said lever arms being pivoted intermediate their ends to said frame means.

3. A vehicle comprising, in combination, body means; frame means supporting said body means; wheel means operatively connected to said frame means and including a steerable first and second pair of front wheels disposed in tandem alignment; a tongue portion adapted to be attached to a tractor and being pivoted at its rearward end to said frame means for turning said wheel means; and lever means including a longer lever arm pivoted to said tongue portion at one end and pivoted to a shorter lever arm at the other end, each of said lever arms being pivoted intermediate their ends to said frame means.

4. A vehicle comprising, in combination, body means; frame means supporting said body means; wheel means operatively connected to said frame means and including a first and second pair of front wheels disposed in tandem alignment and at least one pair of rear wheels; steering means operatively connected to said frame means including a tongue portion; and linkage means operatively connected to said tongue portion and including a longer lever bar pivoted to said frame means at a point closer to its rearward end than its forward end, a shorter lever bar pivoted to said frame means at a point equidistant from its ends and further pivoted at one of its ends to said rearward end of said longer lever bar, each of said lever bars being operatively connected to a certain one of said first and second pairs of wheels.

5. A vehicle comprising, in combination, body means; frame means supporting said body means; wheel means operatively connected to said frame means and including a steerable first and second pair of front wheels disposed in tandem alignment; a tongue portion adapted to be attached to a tractor and being pivoted at its rearward end to said frame means for turning said wheel means; and lever means including a longer lever arm pivoted in a lost motion connection to said tongue portion at one end and pivoted to a shorter lever arm to form another lost motion connection at the other end, each of said lever arms being pivoted intermediate their ends to said frame means.

6. A vehicle comprising in combination, body means; frame means supporting said body means and including spaced dual axle means extending transversely of said frame means; rear wheel means; front wheel means mounted on said axle means and including a steerable first and second pair of closely adjacent front wheels remote from said rear wheel means and disposed in tandem alignment; lever means pivotably connected to said frame means and including a first connection with said first pair of front wheels and a second connection with said second pair of front wheels, movement of said lever means serving to turn said pairs of wheels in the same direction at different angles of turn to conform with a common turning center, and a tongue pivotably mounted on said frame means forwardly of said axle means and operatively connected to said lever means.

References Cited by the Examiner

UNITED STATES PATENTS

| | | | |
|---|---|---|---|
| 624,264 | 5/1899 | Thomas | 280—99 |
| 1,629,597 | 5/1927 | Stockford | 280—99 |
| 1,747,580 | 2/1930 | Fageol | 280—81 |
| 2,189,453 | 2/1940 | Struensee | 280—99 |
| 2,582,455 | 1/1952 | Potter | 280—103 |
| 2,816,773 | 12/1957 | Miller | 280—103 |
| 2,901,264 | 8/1959 | Hart | 280—91 |
| 3,211,467 | 10/1965 | Siddall | 280—99 |

FOREIGN PATENTS 970,542  12/1960  Great Britain.

KENNETH H. BETTS, *Primary Examiner.*